(12) United States Patent
Roth et al.

(10) Patent No.: US 9,675,209 B2
(45) Date of Patent: Jun. 13, 2017

(54) GRILL OILING APPARATUS

(71) Applicant: Roth Circle II, LLC, St. Louis, MO (US)

(72) Inventors: Justin S. Roth, St. Louis, MO (US); Winton C. Roth, St. Louis, MO (US); Stephen M. Roth, St. Louis, MO (US)

(73) Assignee: Roth Circle II, LLC, St. Louis, MO (US)

( * ) Notice: Subject to any disclaimer, the term of this patent is extended or adjusted under 35 U.S.C. 154(b) by 105 days.

(21) Appl. No.: 14/458,447

(22) Filed: Aug. 13, 2014

(65) Prior Publication Data

US 2015/0230660 A1 Aug. 20, 2015

Related U.S. Application Data

(63) Continuation-in-part of application No. 29/463,709, filed on Feb. 18, 2014, now Pat. No. Des. 715,058.

(51) Int. Cl.
*A47J 37/07* (2006.01)
*A47L 17/08* (2006.01)
*A46B 11/00* (2006.01)

(52) U.S. Cl.
CPC ........... *A47J 37/0786* (2013.01); *A47L 17/08* (2013.01); *A46B 11/001* (2013.01)

(58) Field of Classification Search
CPC combination set(s) only.
See application file for complete search history.

(56) References Cited

U.S. PATENT DOCUMENTS

| | | | |
|---|---|---|---|
| 1,191,578 A * | 7/1916 | Englund | A46B 11/0013 401/28 |
| 1,395,763 A | 11/1921 | Mulherin | |
| 1,763,832 A | 6/1930 | Taylor | |
| 2,307,858 A | 1/1943 | Rufo | |
| 3,099,035 A | 7/1963 | Plost | |
| 3,113,335 A | 12/1963 | Baicker | |
| 2,990,564 A | 7/1964 | Sweeney et al. | |
| 3,153,799 A * | 10/1964 | Williams | A46B 13/06 15/29 |

(Continued)

OTHER PUBLICATIONS

International Search Report and Written Opinion for International App. No. PCT/US2014/050895 dated Dec. 18, 2014, 14 pgs.

(Continued)

*Primary Examiner* — David Walczak
(74) *Attorney, Agent, or Firm* — Armstrong Teasdale LLP

(57) ABSTRACT

A grill oiling apparatus includes a handle having a first end and a second end distal from the first end, a head disposed at the second end of the handle, a container, a fluid applicator coupled to the head, and a fluid release mechanism. The head has a receptacle defined therein. The container is disposed within the receptacle, and has a fluid reservoir defined therein. A valve is configured to control fluid flow out of the fluid reservoir. The fluid applicator includes a plurality of apertures defined therein. The fluid release mechanism is operably coupled to the valve and is configured to actuate the valve between a closed position and an open position to provide fluid communication between the fluid reservoir and the apertures.

20 Claims, 13 Drawing Sheets

(56) References Cited

U.S. PATENT DOCUMENTS

| | | | |
|---|---|---|---|
| 3,405,997 A * | 10/1968 | Diebold | A46B 11/066 |
| | | | 401/46 |
| 4,875,791 A | 10/1989 | Hassan | |
| 6,439,790 B1 | 8/2002 | Kay | |
| 6,443,646 B1 | 9/2002 | MacDonald | |
| D522,246 S | 6/2006 | Franczak et al. | |
| 7,632,033 B2 | 12/2009 | Wales | |
| 7,909,526 B2 | 3/2011 | Wales | |
| 8,099,822 B2 | 1/2012 | Dale et al. | |
| 8,202,016 B2 | 6/2012 | Wales | |
| D674,671 S | 1/2013 | Borovicka et al. | |
| 8,672,572 B1 | 3/2014 | Almada | |
| 2001/0047562 A1 | 12/2001 | Lenkiewicz et al. | |
| 2005/0207820 A1 | 9/2005 | Franczak et al. | |
| 2009/0056748 A1 | 3/2009 | Wales | |
| 2010/0067972 A1 | 3/2010 | Ashworth et al. | |
| 2012/0063836 A1 | 3/2012 | Gilbert et al. | |

OTHER PUBLICATIONS

The Art & Soul of Cooking, Sur La Table Sur La Table Grill Grate Oiler, 10 pages.

* cited by examiner

GRILL OILING APPARATUS

CROSS-REFERENCE TO RELATED APPLICATIONS

This application is a continuation-in-part of U.S. patent application Ser. No. 29/463,709, filed Feb. 18, 2014, entitled "Combined Grill Oiler and Cleaner", which is hereby incorporated by reference in its entirety.

BACKGROUND

The present disclosure relates generally to cooking utensils and, more particularly, to grill oiling apparatus.

When preparing food items on a cooking surface, such as a barbeque grill or other grilling surface, cooking oil or other suitable fluid is often applied to the cooking surface to prevent food items from adhering to the cooking surface. Known grill oiling apparatus designed to facilitate applying oil to a grilling surface have several deficiencies.

For example, some known grill oiling apparatus utilize an absorbent article disposed on the end of a handle. The absorbent article is soaked in cooking oil, and then rubbed on the grilling surface to apply the cooking oil to the grilling surface. Such grill oiling apparatus have limited oil-carrying capacity, and provide no control over how much oil is applied to the grilling surface.

Other known grill oiling apparatus utilize an oil vessel or tank disposed at the end of a handle to apply cooking oil to a grilling surface. The vessels in such embodiments typically include one or more holes in the bottom of the vessel to permit the oil to flow out of the vessel and onto the grilling surface. Such grill oiling apparatus provide inadequate control over the supply and flow rate of cooking oil to the grilling surface, resulting in excessive use and waste of cooking oil in some instances, or insufficient oil being supplied to grilling surface in other instances.

Additionally, known grill oiling apparatus do not provide an adequate cleaning mechanism to clean the grilling surface prior to application of the cooking oil.

Accordingly, a need exists for a grill oiling apparatus that provides superior control over the application and supply of cooking oils and other fluids to a grilling surface.

SUMMARY

In one aspect, a grill oiling apparatus is provided. The grill oiling apparatus includes a handle having a first end and a second end distal from the first end, a head disposed at the second end of the handle, a container, a fluid applicator coupled to the head, and a fluid release mechanism. The head has a receptacle defined therein. The container is disposed within the receptacle, and has a fluid reservoir defined therein. A valve is configured to control fluid flow out of the fluid reservoir. The fluid applicator includes a plurality of apertures defined therein. The fluid release mechanism is operably coupled to the valve and is configured to actuate the valve between a closed position and an open position to provide fluid communication between the fluid reservoir and the apertures.

In another aspect, a grill oiling apparatus is provided. The grill oiling apparatus includes a housing including a handle portion and a head portion disposed distal from the handle portion, a container, a fluid applicator coupled to the head portion, a fluid release mechanism, and a liquid cleaning system. The head portion of the housing has a receptacle defined therein. The container is disposed within the receptacle, and has a first fluid reservoir defined therein. The fluid applicator includes a plurality of apertures defined therein. The fluid release mechanism is operable to selectively release fluid from the container through the apertures defined in the fluid applicator. The liquid cleaning system includes a second fluid reservoir enclosed within the housing and a valve configured to control fluid flow out of the second fluid reservoir.

In yet another aspect, a grill oiling apparatus is provided. The grill oiling apparatus includes a handle having a first end and a second end distal from the first end, a head disposed at the second end of the handle, a container, and an elastomeric fluid applicator connected to the head. The head has a receptacle defined therein. The container is disposed within the receptacle, and has a fluid reservoir defined therein. The fluid applicator is coupled in fluid communication with the fluid reservoir, and has a plurality of flow regulating slits defined therein. The flow regulating slits are configured to selectively dispense fluid from the fluid reservoir.

In yet another aspect, a grill oiling apparatus is provided. The grill oiling apparatus includes a handle having a first end and a second end distal from the first end, a head disposed at the second end of the handle, an elastomeric fluid applicator connected to the head, and a valve. The head has a fluid reservoir and an outlet orifice defined therein. The fluid applicator has a plurality of apertures defined therein that extend from an interior surface of the fluid applicator to an exterior surface of the fluid applicator. The valve is configured to control fluid flow out of the fluid reservoir through the outlet orifice. The valve is operably coupled to the fluid applicator and moveable between a closed position and an open position in response to a force applied to the exterior surface of the fluid applicator.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION OF THE DRAWINGS

Figure 1:
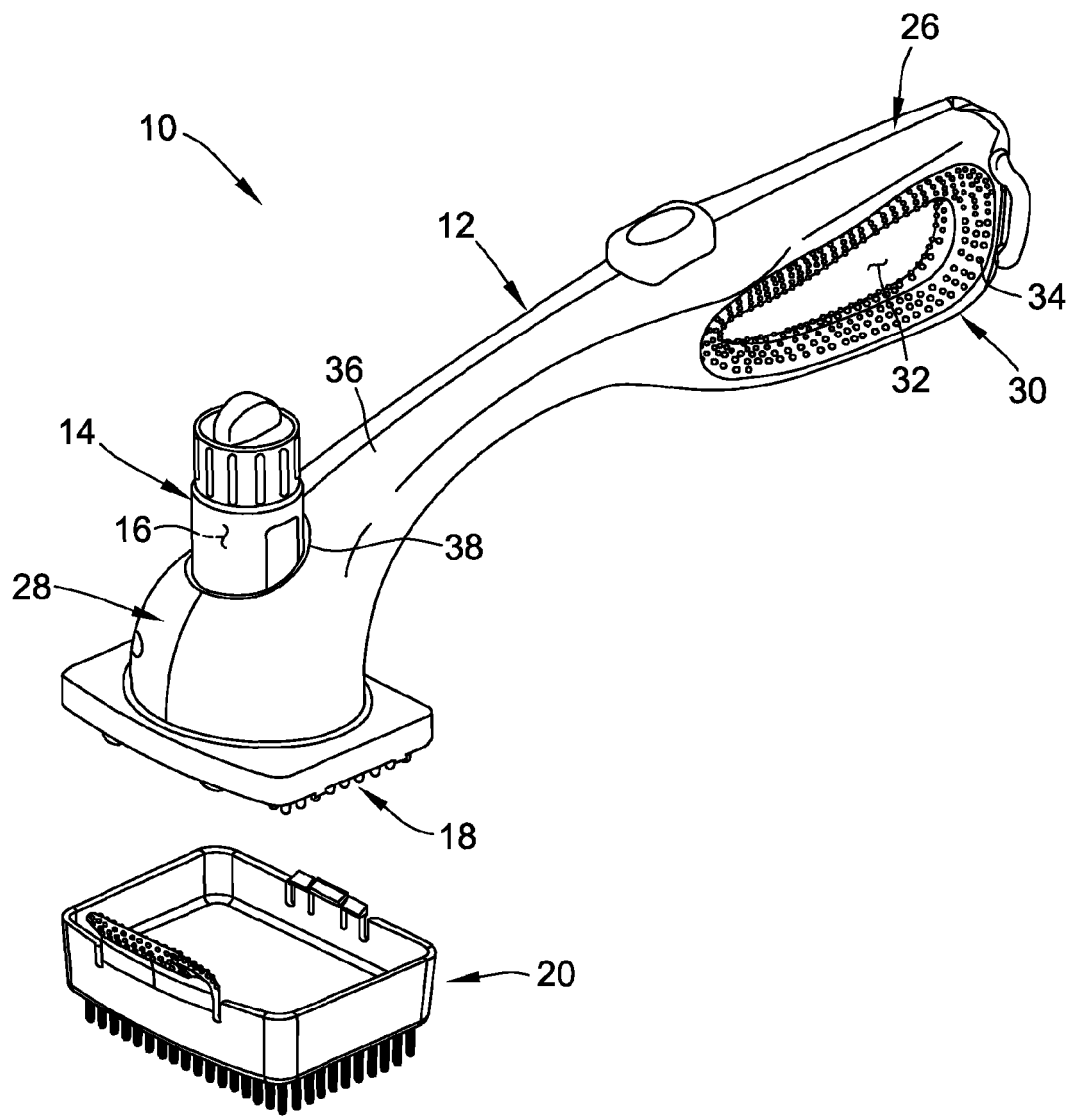
FIG. 1 is a perspective view of one suitable embodiment of a grill oiling apparatus including a container, an oil applicator, and a detachable cleaning brush, the detachable cleaning brush being illustrated in a detached state.
Figure 2:
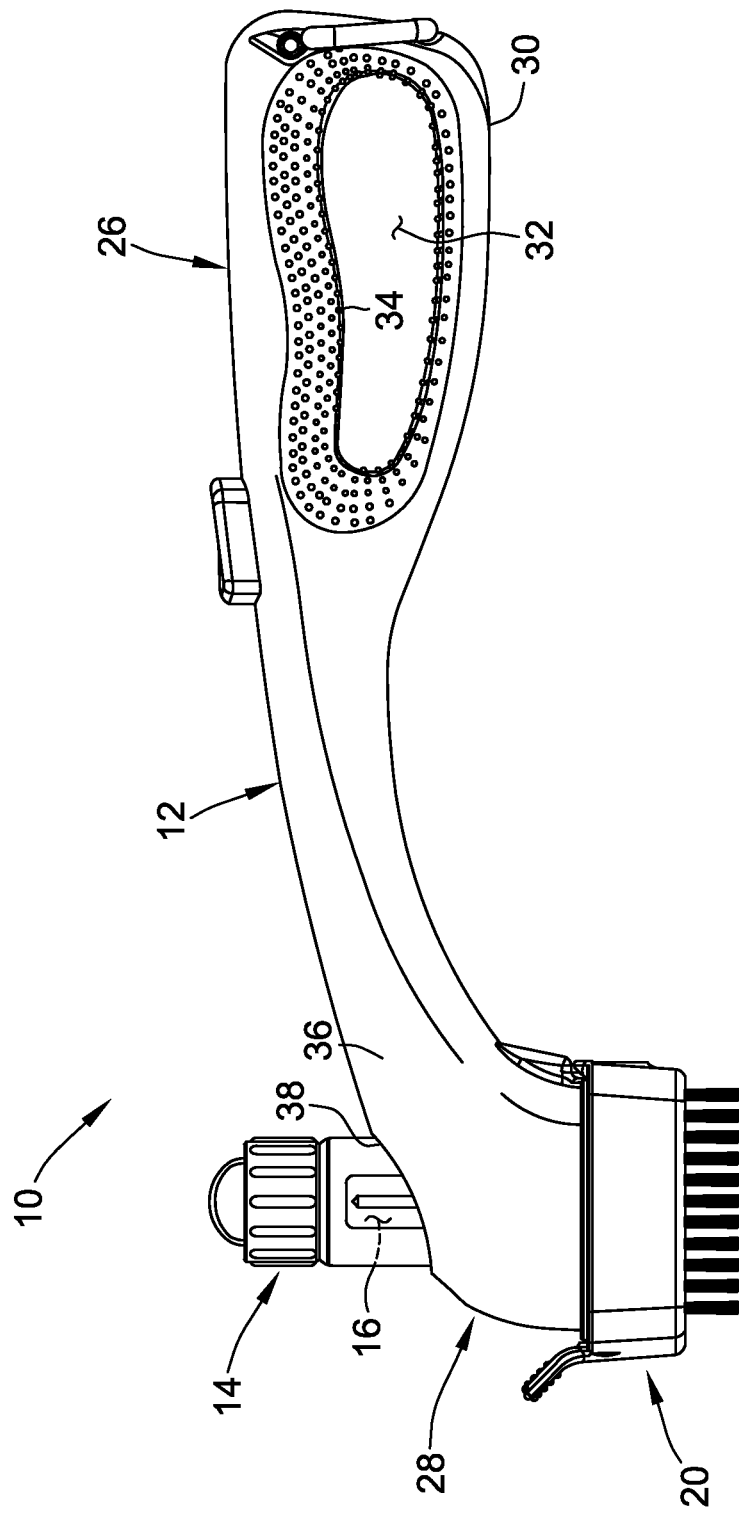
FIG. 2 is a side view of the grill oiling apparatus of FIG. 1 with the detachable cleaning brush illustrated in an attached state.
Figure 3:
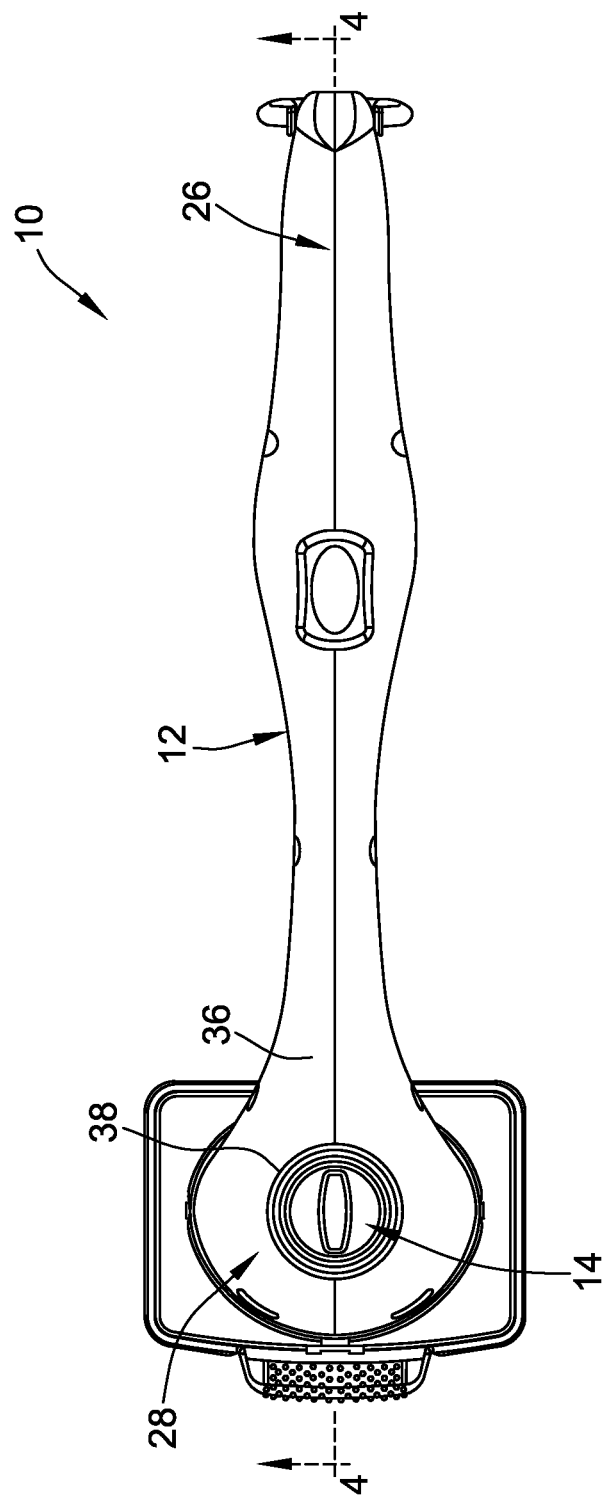
FIG. 3 is a top view of the grill oiling apparatus of FIG. 2.

Referring now to the drawings and in particular to FIGS. 1-8, one embodiment of a grill oiling apparatus is designated in its entirety by the reference number 10. The illustrated grill oiling apparatus 10 generally includes a housing 12, a container 14 defining a fluid reservoir 16, an oil applicator 18 (broadly, a fluid applicator), and a detachable cleaning brush 20. The grill oiling apparatus 10 is configured to apply fluids, such as cooking oils contained within the fluid reservoir 16, to a cooking surface, such as a grilling surface. The supply of fluid from the fluid reservoir 16 to the oil applicator 18 is controlled by a user-actuated fluid release mechanism 22 (shown in FIG. 4), which enables a user to selectively release fluid from the fluid reservoir 16 to the oil applicator 18 to apply the fluid to a cooking or grilling surface (not shown). In the illustrated embodiment, the grill oiling apparatus 10 also includes a fluid lockout feature 24 (shown in FIG. 4).

The housing 12 may be constructed from a variety of suitable materials including, for example, die cast aluminum, heat resistant plastics (e.g., acrylonitrile butadiene styrene), and combinations thereof. The housing 12 may have a unitary construction or, as shown in FIGS. 1-5, the housing 12 may have a modular construction. The housing 12 includes a handle portion 26 (broadly, a handle) and a head portion 28 (broadly, a head) disposed distal from the handle portion 26. The handle portion 26 is suitably sized and shaped to enable a user to manually grasp the grill oiling apparatus 10 and control application of fluids to a grilling surface.

In the illustrated embodiment, the handle portion 26 includes a closed loop segment 30 defining an opening 32 configured to receive a user's hand and/or fingers therein. The closed loop segment 30 provides the user's hand protection from heat when the grill oiling apparatus 10 is used over an open heat source or hot surface. In other suitable embodiments, the handle portion 26 may not include a closed loop segment.

In the illustrated embodiment, the handle portion 26 also includes a gripping surface 34 configured to facilitate gripping the handle portion 26. The illustrated gripping surface 34 includes textured elastomeric inserts, although any suitable gripping surface may be utilized with the grill oiling apparatus 10 that facilitates gripping the handle portion 26. In other embodiments, for example, the handle portion 26 may include longitudinally-spaced ridges and/or ribs to facilitate gripping the handle portion 26. In the illustrated embodiment, the gripping surface 34 is disposed around the opening 32, although the gripping surface 34 may be disposed on any suitable portion of the handle portion 26 that enables the grill oiling apparatus 10 to function as described herein.

The head portion 28 is disposed at a distal end 36 of the handle portion 26. In the illustrated embodiment, the head portion 28 is formed integrally with the handle portion 26. In other suitable embodiments, the head portion 28 may be formed separately from and coupled to the distal end 36 of the handle portion 26.

Figure 4:
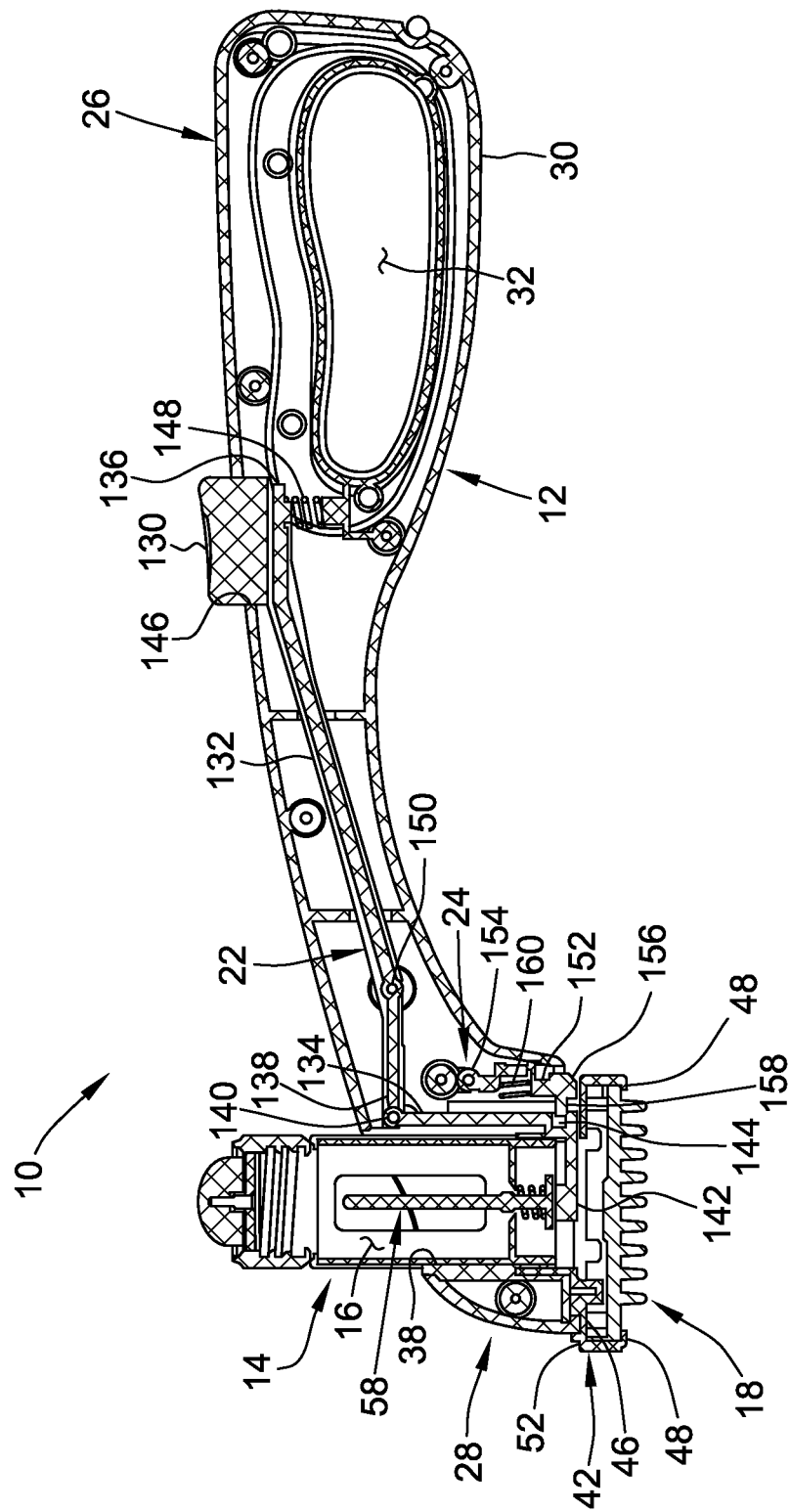
FIG. 4 is a cross-sectional view of the grill oiling apparatus taken along line "4-4" of FIG. 3 with the detachable cleaning brush omitted for clarity.

The head portion 28 has a receptacle 38 defined therein (FIG. 4). The receptacle 38 is sized and shaped to receive the container 14 therein. In the illustrated embodiment, the receptacle 38 has a generally cylindrical shape, which corresponds to the cylindrical shape of the container 14, but it is understood that the receptacle 38 and the associated container 14 can have any suitable size and/or shape that enables the grill oiling apparatus 10 to function as described herein.

Figure 5:
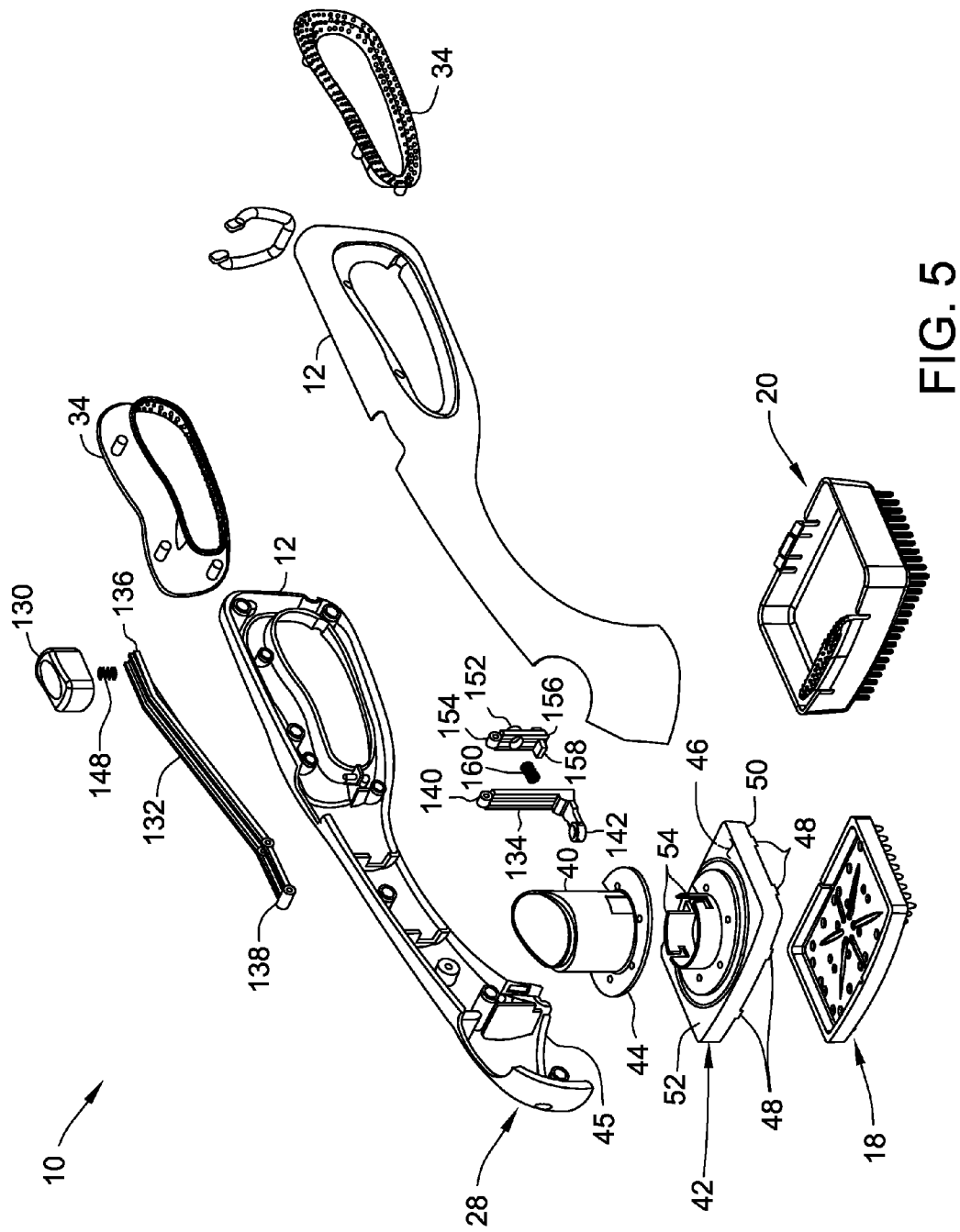
FIG. 5 is an exploded view of the grill oiling apparatus of FIG. 1.

In the illustrated embodiment, the head portion 28 includes a sleeve 40 and a mounting plate 42 (both shown in FIG. 5). The sleeve 40 and the mounting plate 42 collectively define the receptacle 38 in the illustrated embodiment. In other suitable embodiments, the receptacle 38 may be defined by other portions of the head portion 28, such as the housing 12.

The sleeve 40 is enclosed within the head portion 28, and includes a flange 44 that engages an interior rim 45 of the head portion 28. The mounting plate 42 is secured to the flange 44 by fasteners (not shown). The mounting plate 42 is configured to be releasably coupled to the oil applicator 18 and the cleaning brush 20. In the illustrated embodiment, the mounting plate 42 defines a cavity 46 sized to receive a portion of the oil applicator 18 therein. The mounting plate 42 includes retaining tabs 48 extending inwardly into the cavity 46 from a lower surface 50 of the mounting plate 42. The retaining tabs 48 are configured to engage the oil applicator 18 and maintain a connection between the mounting plate 42 and the oil applicator 18. The mounting plate 42 also includes an upper surface 52 opposite the lower surface 50 configured to engage one or more retaining elements on the cleaning brush 20 to maintain a connection between the mounting plate 42 and the cleaning brush 20.

The head portion 28 also has retaining slots 54 defined therein configured to matingly engage retaining elements on the container 14 (described in more detail herein) to releasably secure the container 14 within the receptacle 38. In the illustrated embodiment, the retaining slots 54 are defined by the mounting plate 42, although the retaining slots 54 may be defined by any other suitable portion of the head portion 28, such as the sleeve 40 or the housing 12.

Figure 6:
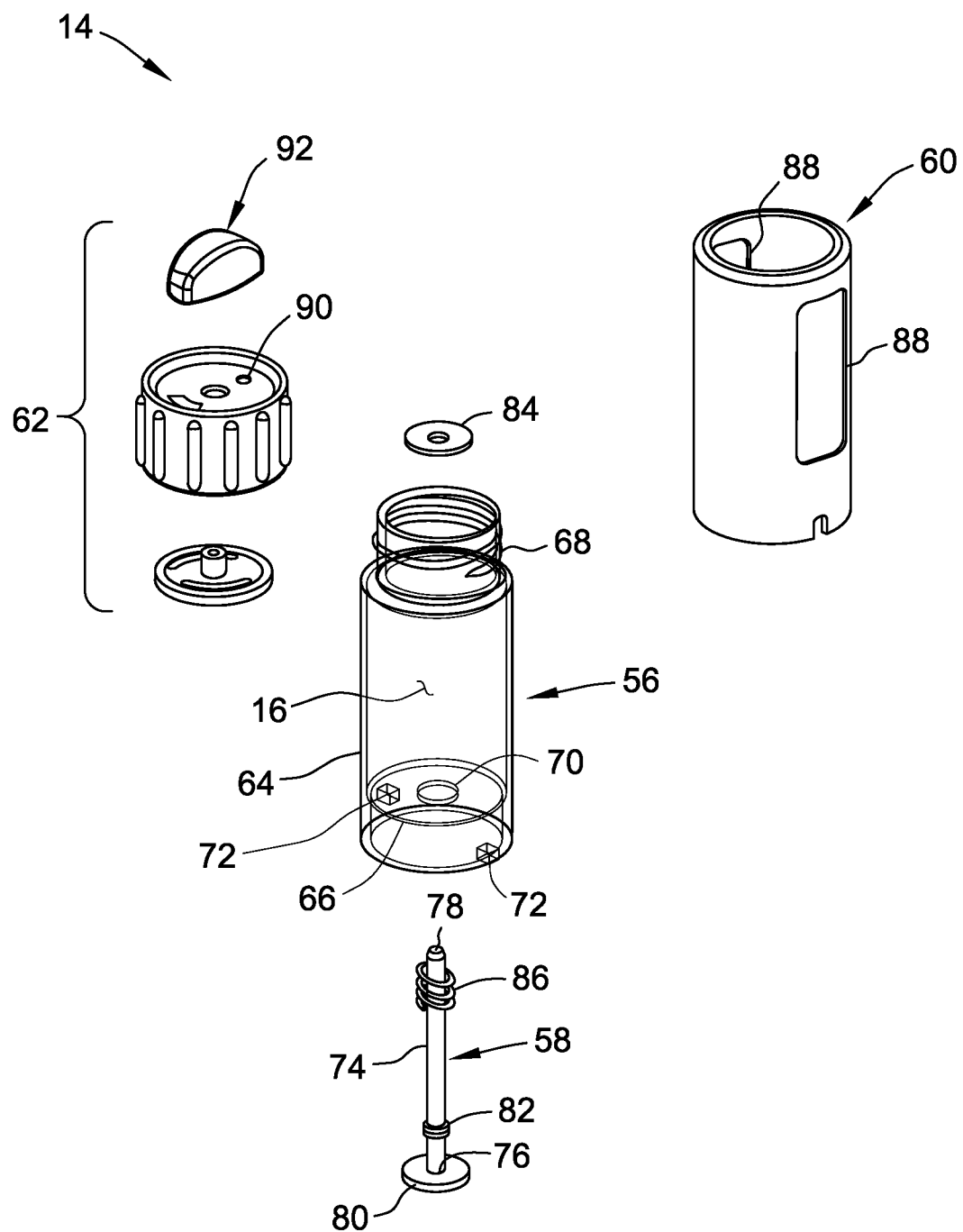
FIG. 6 is an exploded view of the container of the grill oiling apparatus.
Figure 7:
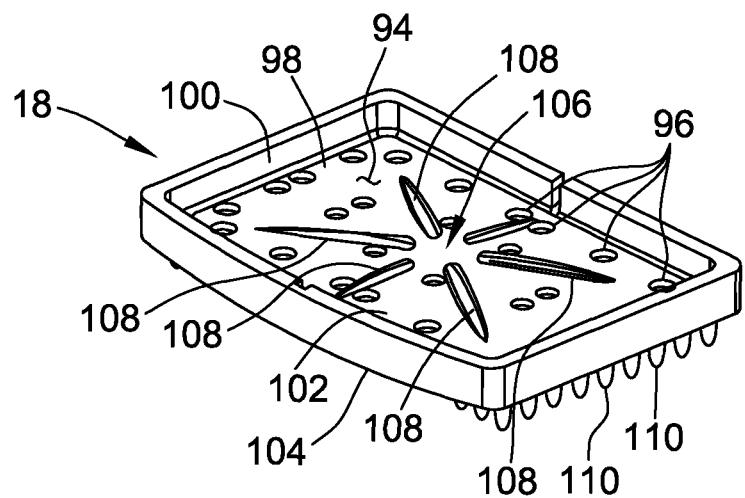
FIG. 7 is a perspective view of the oil applicator of the grill oiling apparatus.
Figure 8:
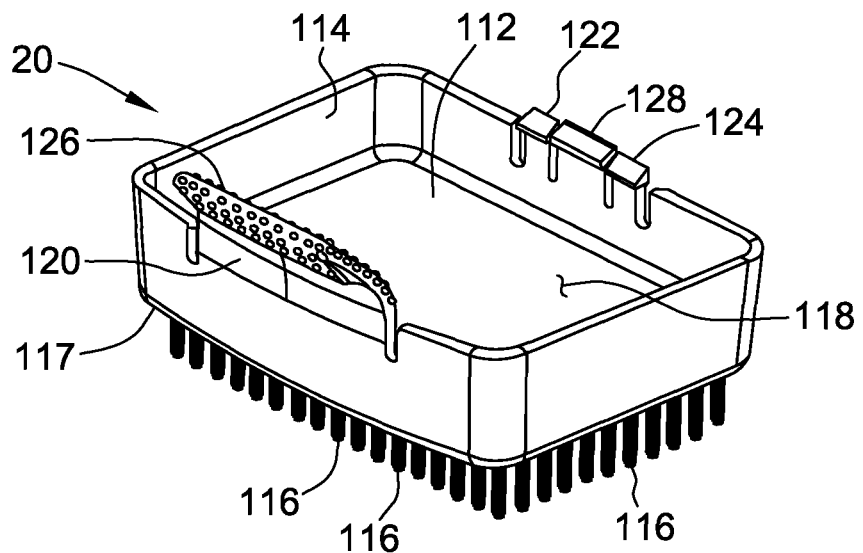
FIG. 8 is a perspective view of the detachable cleaning brush of the grill oiling apparatus.

The container 14 is sized and shaped to be received within the receptacle 38. In the illustrated embodiment, the container 14 has a generally cylindrical shape corresponding to the cylindrical shape of the receptacle 38. As shown in FIG. 6, the illustrated container 14 includes a vial 56, a valve 58 disposed within the vial 56, a shroud 60 at least partially surrounding the vial 56, and a lid 62.

The vial 56 is constructed from a suitably translucent or transparent material that enables a user to see the interior of the fluid reservoir 16. Suitable materials include, for example, high-density polyethylene, polypropylene, polyethylene terephthalate, and glass. The vial 56 includes a peripheral sidewall 64, a floor 66, and a neck 68 disposed opposite the floor 66. The sidewall 64 and the floor 66 collectively define the fluid reservoir 16. The vial floor 66 has an outlet orifice 70 defined therein which provides fluid communication between the fluid reservoir 16 and the oil applicator 18 when the container 14 is disposed within the receptacle 38.

In the illustrated embodiment, the vial 56 also includes retaining elements 72 extending outward from the peripheral sidewall 64. The retaining elements 72 are configured to matingly engage the retaining slots 54 in the mounting plate 42 to secure the container 14 within the receptacle 38. The illustrated vial 56 includes two diametrically opposed retaining elements 72, although the vial 56 may include more or less than two retaining elements. Further, in other suitable embodiments, the retaining elements may be disposed on other portions of the container 14, such as the shroud 60.

The fluid reservoir 16 is configured to hold a volume of fluid therein. The fluid reservoir 16 may have any suitable volume that enables the grill oiling apparatus 10 to function as described herein. For example, the fluid reservoir 16 may have a volume of between about 10 milliliters (mL) and about 100 mL, more suitably between about 35 mL and about 75 mL, and even more suitably, between about 45 mL and about 60 mL.

The valve 58 is configured to control fluid flow out of the fluid reservoir 16. The valve 58 is moveable between a closed position (shown in FIG. 4) in which the valve inhibits fluid flow out of the fluid reservoir 16, and an open position in which the valve 58 permits fluid flow out of the fluid reservoir 16. The valve 58 includes a valve stem 74 having a first end 76 and a second end 78, a base 80 disposed at the first end 76 of the valve stem 74, and a valve member 82 disposed along the valve stem 74. The valve member 82 is configured to seal the outlet orifice 70 when the valve 58 is in the closed position (shown in FIG. 4). An elastomeric seal 84 is disposed between the valve member 82 and the vial floor 66 to facilitate sealing of the outlet orifice 70.

A spring 86 (broadly, a biasing member) biases the valve 58 towards the closed position. More specifically, the spring 86 is disposed between the vial floor 66 and the valve base 80. The spring 86 engages the vial floor 66, and exerts a biasing force on the valve base 80 away from the vial floor 66. The valve base 80 is also disposed for engagement with the fluid release mechanism 22 for actuation of the valve 58 between the open and closed positions, as described in more detail herein.

In the illustrated embodiment, the valve stem 74 extends beyond the valve member 82 and into the fluid reservoir 16 such that the second end 78 of the valve stem 74 projects out of the receptacle 38 when the container 14 is positioned within the receptacle 38. The second end 78 of the valve stem 74 is visible through the translucent or transparent vial 56 when the container 14 is positioned in the receptacle 38. Further, when the valve 58 is actuated, movement of the second end 78 of the valve stem 74 is perceptible by a user. The valve stem 74 thus provides a visual indicator of the position of the valve 58 (e.g., whether the valve 58 is opened or closed) to a user of the grill oiling apparatus 10.

The shroud 60 is sized and shaped to receive the vial 56 therein. The shroud 60 is configured to at least partially enclose the vial 56, and protect the vial 56 from excessive heat exposure. The shroud 60 is suitably constructed of heat resistant materials, such as die-cast aluminum. In the illustrated embodiment, the shroud 60 has windows 88 defined therein that enable a user to view the valve stem 74 through the translucent or transparent vial 56. That is, the windows 88 provide a user with a visual line-of-sight to the valve stem 74.

The lid 62 is configured to be releasably connected to the vial neck 68 to seal the fluid reservoir 16. In the example embodiment, the lid 62 includes threads configured to engage complementary threads on the vial neck 68, although the lid 62 may include any suitable releasable connector that enables the container 14 to function as described herein.

The lid 62 has a ventilation opening 90 defined therein that provides fluid communication between the fluid reservoir 16 and the exterior environment. The ventilation opening 90 permits air flow into the fluid reservoir 16 when fluid flows out of the fluid reservoir 16 through outlet orifice 70, thereby preventing a vacuum or low pressure condition from developing in the fluid reservoir 16 and inhibiting fluid flow. The lid 62 also includes a ventilation valve 92 moveable between an open position and a closed position to control air flow through the ventilation opening 90. In the illustrated embodiment, the ventilation valve 92 is rotatable between the open and closed positions. The ventilation valve 92 can be positioned at various intermediate positions between the open and closed positions to partially obstruct the ventilation opening 90. The ventilation valve 92 thereby enables a user to control the rate of air flow through the ventilation opening 90, and consequently, the fluid flow rate through the outlet orifice 70. Although the illustrated lid 62 is shown with a single ventilation opening 90, the lid 62 may include any suitable number of ventilation openings that enables the lid 62 to function as described herein, such as two or three ventilation openings.

The oil applicator 18 is coupled to the head portion 28 of the housing 12, and is coupled in fluid communication with the fluid reservoir 16. In the illustrated embodiment, the oil applicator 18 is coupled to the head portion 28 by the mounting plate 42. More specifically, the oil applicator 18 is press-fit into the cavity 46 defined by the mounting plate 42, and the retaining tabs 48 engage an exterior surface of the oil applicator 18 to retain the oil applicator 18 within the cavity 46.

The oil applicator 18 is constructed from a suitably flexible, resilient material. Suitable materials include, but are not limited to, elastomeric materials, such as silicone rubbers. Other suitable elastomeric materials include, but are not limited to, fluoroelastomers, such as fluorine rubber, FKM, FPM, and Vitron® rubber commercially available from E. I. du Pont de Nemours & Company of Wilmington, Del., and high temperature nylons, such as Zytel® nylon resins commercially available from E. I. du Pont de Nemours & Company of Wilmington, Del. Other suitable elastomeric materials include, but are not limited to, ethylene propylene rubber, epichlorohydrin rubber, polyacrylic rubber, perfluoroelastomers, polyether block amides chlorosulfonated polyethylene, ethylene-vinyl acetate, and combinations thereof.

The flexible, resilient construction of the oil applicator 18 facilitates attachment and removal of the oil applicator 18 to the mounting plate 42. Thus, the oil applicator 18 can be easily removed from the mounting plate 42 to clean the oil applicator 18 or to replace the oil applicator 18.

The oil applicator 18 is configured to apply fluids from the fluid reservoir 16 to a cooking or grilling surface. Specifically, with additional reference to FIG. 7, the oil applicator 18 has a fluid chamber 94 defined therein, and a plurality of apertures 96 providing fluid communication between the fluid chamber 94 and the external environment. When the grill oiling apparatus 10 is in the assembled configuration (shown in FIGS. 1-4), the fluid chamber 94 is coupled in fluid communication with the outlet orifice 70 of the container 14. When the valve 58 is actuated by fluid release mechanism 22, and the grill oiling apparatus 10 is held in an upright orientation (shown in FIGS. 1, 2, and 4), fluid within the fluid reservoir 16 flows through outlet orifice 70, into fluid chamber 94, and out apertures 96. The fluid flowing out apertures 96 can be applied to a desired surface, such as a cooking or grilling surface.

In the illustrated embodiment, the oil applicator 18 has a generally rectangular shape. The oil applicator 18 includes a base 98 and a peripheral sidewall 100 extending from the base 98 and around the perimeter of the oil applicator 18. The fluid chamber 94 is defined by the peripheral sidewall 100 and the base 98. The apertures 96 are defined in the base 98, and extend from an interior surface 102 of the base 98 to an exterior surface 104 of the base 98.

The apertures 96 are suitably sized and shaped to permit fluid flow therethrough. The apertures 96 may each have the same size, or the apertures 96 may have different sizes. In the illustrated embodiment, for example, apertures 96 disposed proximate a central region 106 of the base 98 are smaller than apertures 96 disposed proximate the peripheral sidewall 100 of the oil applicator 18. The apertures 96 may each have the same shape, or the apertures may have different shapes. In the illustrated embodiment, each aperture 96 has a generally circular shape. The illustrated embodiment includes 28 apertures 96, although the oil applicator 18 may include any suitable number of apertures that enables the grill oiling apparatus 10 to function as described herein. For example, the oil applicator 18 may include between about 5 apertures 96 and about 45 apertures 96, more suitably between about 10 apertures 96 and about 40 apertures 96, and even more suitably, between about 15 apertures 96 and about 30 apertures 96.

The interior surface 102 of the base 98 is configured to facilitate even distribution of fluids across the oil applicator 18. Specifically, the interior surface 102 of the base 98 includes a plurality of fluid guiding channels 108 defined therein. The fluid guiding channels 108 are configured to facilitate even distribution of fluid across the base 98 of the oil applicator 18 by directing fluid from the central region 106 of the base 98 to apertures 96 disposed proximate the peripheral sidewall 100 of the oil applicator 18. Each fluid guiding channel 108 extends from a point proximate the central region 106 of the base 98 towards the peripheral sidewall 100. Further, the central region 106 of the base 98 is raised relative to peripheral outer regions of the base 98. In other words, the interior surface 102 of the base 98 slopes downward from the central region 106 to the peripheral sidewall 100 to facilitate fluid flow away from the central region 106 and towards apertures 96 disposed proximate the peripheral sidewall 100. The fluid guiding channels 108 also slope downwardly as the fluid guiding channels 108 extend from the central region 106 towards the peripheral sidewall 100. The slope of the fluid guiding channels 108 further facilities even distribution of fluids across the oil applicator 18.

The illustrated embodiment includes six fluid guiding channels 108 arranged circumferentially around the central region 106 of the interior surface 102. Other suitable embodiments may include more or less than six fluid guiding channels. In yet other suitable embodiments, the fluid guiding channels 108 may be arranged in any suitable arrangement that enables the grill oiling apparatus 10 to function as described herein.

In the illustrated embodiment, the oil applicator 18 also includes a plurality of applicator fingers 110 extending outward from the exterior surface 104 of the base 98. The applicator fingers 110 facilitate the application of fluids to contoured and non-planar surfaces, such as grill grates.

The cleaning brush 20 is removably coupleable to the head portion 28 of the housing 12, and is configured to clean and clear debris from a cooking or grilling surface. With additional reference to FIG. 8, the illustrated cleaning brush 20 includes a base 112, a peripheral sidewall 114 extending from the base 112 and around the perimeter of the base 112, and a plurality of bristles 116 extending outwards from an exterior surface 117 of the base 112. The base 112 and the sidewall 114 define a cavity 118 in which the oil applicator 18 is enclosed when the cleaning brush 20 is attached to the mounting plate 42. The bristles 116 are configured to clean and clear debris from a cooking or grilling surface. The bristles 116 may be constructed from a variety of suitable materials including, for example, stainless steel wire.

The cleaning brush 20 also includes a plurality of resilient retaining clips 120, 122, 124 configured to releasably connect the cleaning brush 20 to the head portion 28. Each retaining clip 120, 122, 124 is elastically deformable and biased towards a relaxed position (shown in FIG. 8) such that the retaining clips 120, 122, 124 return to their respective relaxed positions in the absence of an applied force. In the illustrated embodiment, the cleaning brush 20 includes a first retaining clip 120 disposed on a first side of the cleaning brush 20, and second and third retaining clips 122, 124 disposed on a second side of the cleaning brush 20 opposite the first side. The retaining clips 120, 122, 124 are configured to engage the upper surface 52 of the mounting plate 42 to maintain the connection between the cleaning brush 20 and the mounting plate 42. When the cleaning brush 20 is attached to the mounting plate 42, the resilient force of the first retaining clip 120 urges the second and third retaining clips 122, 124 against the mounting plate 42, and the resilient forces of the second and third retaining clips 122, 124 urge the first retaining clip 120 against the mounting plate 42. The first retaining clip 120 includes a textured grip extension 126 configured to facilitate attachment and removal of the cleaning brush 20.

The cleaning brush 20 also includes an engagement finger 128 configured to activate the fluid lockout feature 24 when the cleaning brush 20 is attached to the head portion 28. In the illustrated embodiment, the engagement finger 128 is disposed between the second and third retaining clips 122, 124, although the engagement finger 128 may be disposed at any suitable location on the cleaning brush 20 that enables the grill oiling apparatus 10 to function as described herein.

The fluid release mechanism 22 is configured to actuate the valve 58 between the open and closed positions, and provide selective fluid communication between the fluid reservoir 16 and the oil applicator 18. The fluid release mechanism 22 includes a user-actuatable button 130 operably coupled to the valve 58 by linking arms 132, 134. The illustrated embodiment includes a first linking arm 132 and a second linking arm 134 enclosed within the housing 12. The first linking arm 132 includes a first end 136 connected to the button 130, and a second end 138 opposite the first end 136. The second linking arm 134 includes a first end 140 rotatably connected to the second end 138 of the first linking arm 132, and a second end 142 opposite the first end 140. The second end 142 of the second linking arm 134 is configured to engage the valve base 80. In the illustrated embodiment, the second linking arm 134 also includes a locking slot 144 configured to cooperate with the fluid lockout feature 24 to inhibit actuation of the valve 58, described in more detail herein.

The button 130 is connected to the first end 136 of the first linking arm 132, and projects outward of the housing 12 through an opening 146 defined therein. The button 130 is moveable between a first, raised position (shown in FIG. 4), and a second, lowered position (not shown). In the illustrated embodiment, the button 130 is depressible from the first position to the second position, although the button 130 may be moveable in any suitable manner that enables the grill oiling apparatus 10 to function as described herein. In some embodiments, for example, the button 130 may be slidable along a track defined in the housing 12 to actuate the fluid release mechanism 22. A spring 148 (broadly, a biasing member) biases the button 130 towards the first position.

The first linking arm 132 is pivotably connected to the housing 12 at a pivot point 150 between the first end 136 and the second end 138. The first linking arm 132 pivots about the pivot point 150 when the button 130 is moved between the first position and the second position. When the button 130 is moved from the first position to the second position (e.g., when depressed by a user), the first linking arm 132 rotates about the pivot point 150 in a first direction (a clockwise direction in FIG. 4) and exerts an upward or tensile force on the second linking arm 134. The rotation of the first linking arm 132 moves the second linking arm 134 in a generally upward direction, causing the second end 142 of the second linking arm 134 to engage the valve base 80, and raise the valve 58 from the closed position to the open position. When a user releases the button 130, the biasing force of the spring 148 returns the button 130 to the first position. The first linking arm 132 rotates about the pivot point 150 in a second direction, opposite to the first direction (a counter-clockwise direction in FIG. 4), and exerts a downward or compressive force on the second linking arm 134. The second linking arm 134 moves in a generally downward direction, and the biasing force of the valve spring 86 returns the valve to the closed position.

As noted above, the button 130 is disposed along the handle portion 26 of the housing 12. In other words, the fluid release mechanism 22 extends from the handle portion 26 to the head portion 28. The configuration of the fluid release mechanism 22 thus enables a user to hold the grill oiling apparatus 10 by the handle portion 26, and actuate the valve 58, thereby controlling the supply of fluid to the oil applicator 18, with a single hand.

The fluid lockout feature 24 is configured to inhibit actuation of the valve 58 when the fluid lockout feature 24 is activated. The fluid lockout feature 24 is activated by attachment of the cleaning brush 20. In the illustrated embodiment, the fluid lockout feature 24 includes a locking arm 152 having a first end 154 rotatably connected to the housing 12, and a second end 156 distal from the first end 154. The locking arm 152 includes a locking finger 158 sized and shaped to be received within the locking slot 144 defined in the second linking arm 134. When the locking finger 158 is positioned within the locking slot 144, the locking finger 158 inhibits movement of the second linking arm 134 and, consequently, actuation of the valve 58. In the illustrated embodiment, the locking finger 158 is disposed adjacent the second end 156 of the locking arm 152, although the locking finger 158 may be located at any suitable position on the locking arm 152 that enables the fluid lockout feature 24 to function as described herein.

The locking arm 152 is moveable and, more specifically, rotatable between a first position and a second position in which the fluid lockout feature 24 is activated. When the locking arm 152 is in the second position, the locking finger 158 is positioned within the locking slot 144 defined in the second linking arm 134. A spring 160 (broadly, a biasing member) disposed between the locking arm 152 and the second linking arm 134 biases the locking arm 152 towards the first position.

When the cleaning brush 20 is attached to the head portion 28, the engagement finger 128 engages the locking arm 152 proximate the second end 156 of the locking arm 152, and moves the locking arm 152 from the first position to the second position. As the locking arm 152 rotates from the first position to the second position, the locking finger 158 is inserted in the locking slot 144. The engagement finger 128 maintains the locking arm 152 in the second position and the locking finger 158 within the locking slot 144 while the cleaning brush 20 is attached to the mounting plate 42. In other words, the fluid lockout feature 24 is activated while the cleaning brush 20 is attached to the mounting plate 42, thereby preventing actuation of the valve 58 and the supply of fluid to the oil applicator 18. The fluid lockout feature 24 thereby prevents fluids, such as oils, from contaminating the cleaning brush 20 and surfaces being cleaned with the cleaning brush 20.

Figure 9:
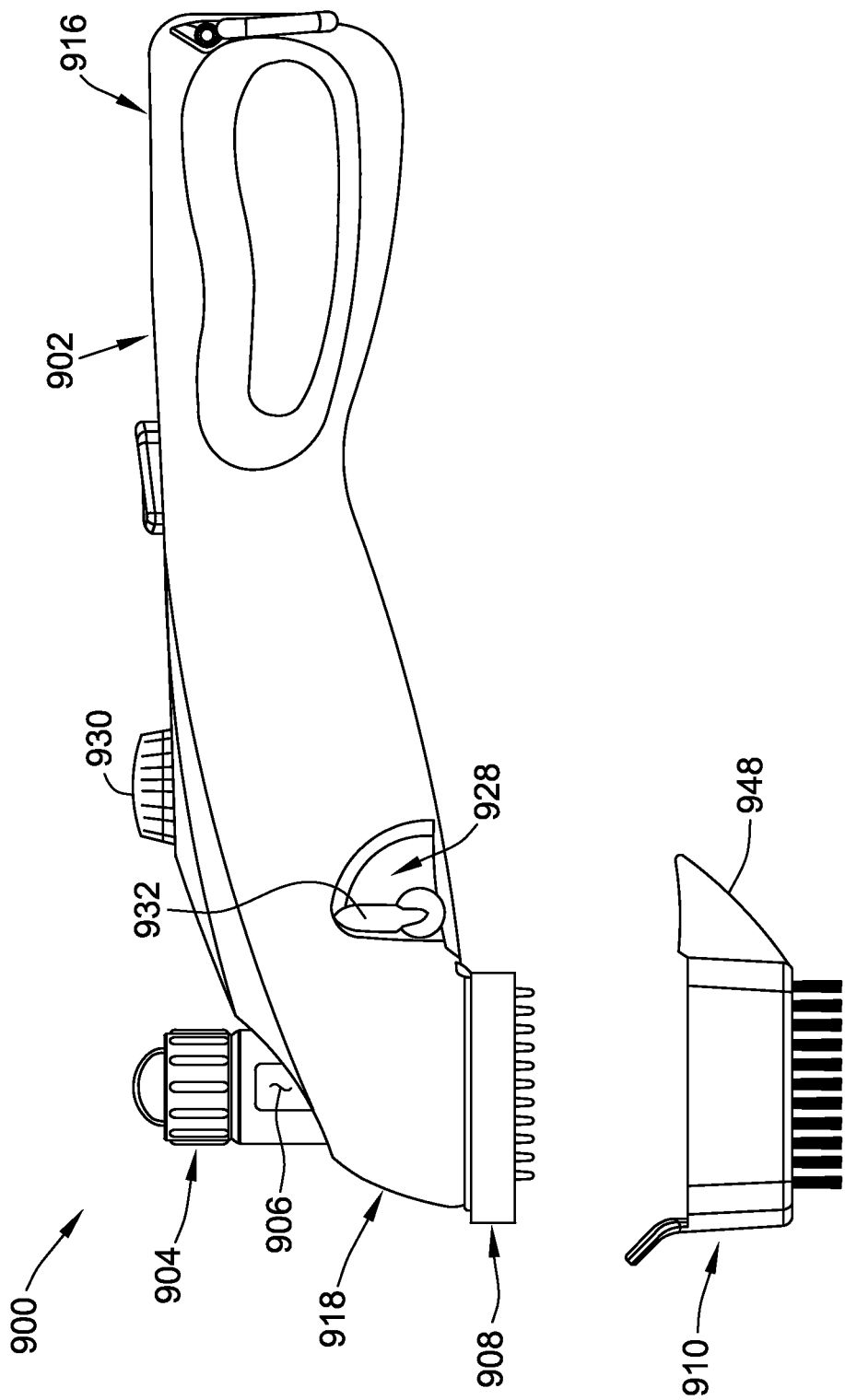
FIG. 9 is a side view of another suitable embodiment of a grill oiling apparatus including a container, an oil applicator, a detachable cleaning brush, and a liquid cleaning system, detachable cleaning brush being illustrated in a detached state.
Figure 10:
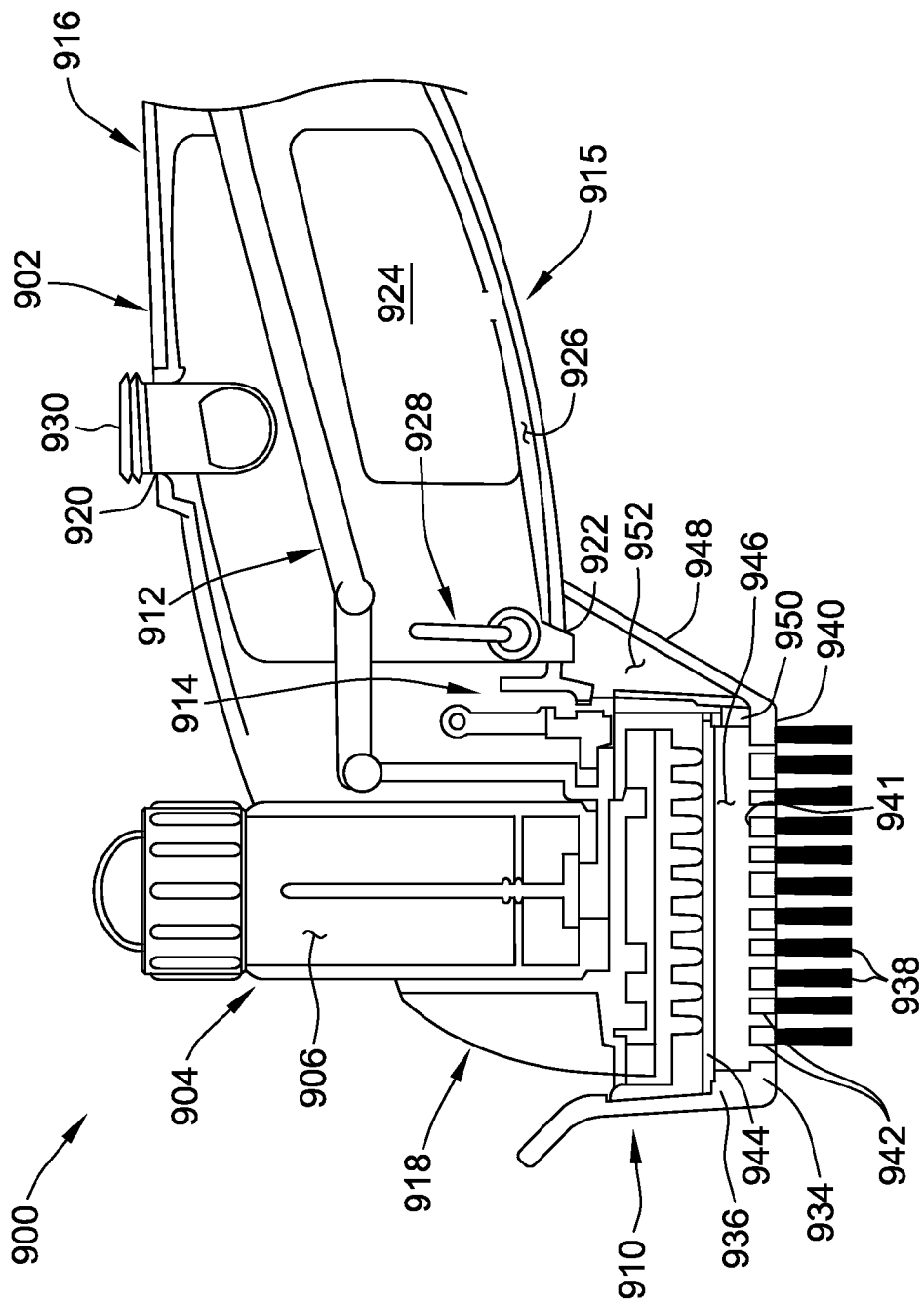
FIG. 10 is a partial cross-sectional view of the grill oiling apparatus of FIG. 9 with the cleaning brush illustrated in an attached state.

FIGS. 9-10 illustrate another suitable embodiment of a grill oiling apparatus, designated in its entirety by the reference number 900. The grill oiling apparatus 900 shown in FIGS. 9-10 is similar to the grill oiling apparatus 10 shown in FIGS. 1-8. For example, the grill oiling apparatus 900 includes a housing 902, a container 904 defining a fluid reservoir 906, an oil applicator 908, a detachable cleaning brush 910, a fluid release mechanism 912 (shown in FIG. 10), and a fluid lockout feature 914 (shown in FIG. 10). Additionally, the grill oiling apparatus 900 includes a liquid cleaning system 915 (shown in FIG. 10).

The housing 902 has a similar configuration and is constructed from the same materials as the housing 12 described above with reference to FIGS. 1-5. The housing 902 includes a handle portion 916 (broadly, a handle) and a head portion 918 (broadly, a head) disposed distal from the handle portion 916. Additionally, the housing 902 has a fluid inlet 920 and a fluid outlet 922 defined therein (both shown in FIG. 10). The fluid inlet 920 and fluid outlet 922 are configured to cooperate with the liquid cleaning system 915 to deliver fluids to the cleaning brush 910, as described in more detail herein.

The container 904, the oil applicator 908, the fluid release mechanism 912, and the fluid lockout feature 914 each have the same configuration and operate in the same manner as the container 14, the oil applicator 18, the fluid release mechanism 22, and the fluid lockout feature 24, respectively, described above with reference to FIGS. 1-8.

The liquid cleaning system 915 includes a fluid reservoir 924, a fluid conduit 926 in fluid communication with the fluid reservoir 924 and the fluid outlet 922, and a valve 928 providing selective fluid communication between the fluid reservoir 924 and the fluid outlet 922.

The fluid reservoir 924 is configured to hold a volume of liquid, such as water, therein. The fluid reservoir 924 may have any suitable volume that enables the grill oiling apparatus 900 to function as described herein. For example, the fluid reservoir 924 may have a volume of between about 50 mL and about 500 mL, more suitably between about 110 mL and about 360 mL, and even more suitably, between about 175 mL and about 240 mL.

The fluid reservoir 924 is enclosed within the housing 902. In the illustrated embodiment, the fluid reservoir 924 is disposed within the handle portion 916 of the housing 902, although it is also contemplated that the fluid reservoir 924 may be enclosed within the head portion 918. In other suitable embodiments, the fluid reservoir 924 may extend from the handle portion 916 to the head portion 918.

The fluid inlet 920 defined within housing 902 provides fluid communication with the fluid reservoir 924. The fluid inlet 920 enables a user to fill the fluid reservoir 924 with fluids, such as water. The fluid inlet 920 may be sealed with a removable cap 930. The cap 930 includes a ventilation opening (not shown) defined therein that permits air flow into the fluid reservoir 924 to prevent a vacuum or low pressure condition from developing in the fluid reservoir 924 and inhibiting fluid flow. In the illustrated embodiment, the cap 930 is connected to the housing by a threaded connection, although the cap 930 may be connected to the housing using any suitable connector that enables the grill oiling apparatus 900 to function as described herein.

The fluid conduit 926 provides fluid communication between the fluid reservoir 924 and the fluid outlet 922 defined in the housing 902. The fluid conduit 926 is fluidly connected to the fluid reservoir 924 at one end, and to the fluid outlet 922 at the other end. The fluid conduit 926 is enclosed within the housing 902. The fluid conduit 926 may be integrally formed with the housing 902 (i.e., defined by the housing 902), or the fluid conduit may be formed separately from the housing 902.

The valve 928 is configured to provide selective fluid communication between the fluid reservoir 924 and the fluid outlet 922. The valve 928 is moveable from a first, open position in which the valve 928 permits fluid flow through the fluid conduit 926 and the fluid outlet 922, and a second, closed position in which the valve 928 inhibits fluid flow through the fluid conduit 926 and the fluid outlet 922. In the illustrated embodiment, the valve 928 is a quarter-turn valve including a handle 932 that is accessible from an exterior of the housing 902 to enable a user to actuate the valve 928. In other suitable embodiments, the valve 928 may be any suitable valve that enables the liquid cleaning system 915 to function as described herein.

The valve 928 is disposed between the fluid outlet 922 and the fluid reservoir 924. In the illustrated embodiment, the valve 928 is disposed proximate the fluid outlet 922, although the valve 928 may be disposed at any suitable location between the fluid reservoir 924 and the fluid outlet 922 that enables the liquid cleaning system 915 to function as described herein.

The cleaning brush 910 is removably coupleable to the head portion 918, and is configured to clean and clear debris from a cooking or grilling surface. Similar to the cleaning brush 910 described above with reference to FIGS. 1-8, the cleaning brush 910 includes a base 934, a peripheral sidewall 936 extending from the base 934 and around the perimeter of the base 934, and a plurality of bristles 938 extending outwards from an exterior surface 940 of the base 934. The cleaning brush 910 also includes a plurality of resilient retaining clips similar to the retaining clips 120, 122, 124 described above with reference to FIGS. 1-8.

The base 934 has a plurality of apertures 942 defined therein. The apertures 942 extend from the exterior surface 940 of the base 934 to an interior surface 941 of the base 934.

In the embodiment illustrated in FIGS. 9-10, the cleaning brush 910 also includes a partition wall 944 partially defining a fluid chamber 946 within the cleaning brush 910, and an extension member 948 configured to fluidly connect the fluid chamber 946 with the fluid outlet 922 and the fluid reservoir 924 when the cleaning brush 910 is attached to the head portion 918.

The partition wall 944 is disposed above and generally parallel to the base 934. The partition wall 944 inhibits fluid communication between the oil applicator 908 and the fluid chamber 946 and apertures 942. In other words, the partition wall 944 prevents residual fluids within and on the oil applicator 908 from contaminating the cleaning brush 910 or a surface being cleaned with the cleaning brush 910.

The fluid chamber 946 is defined by the base 934, the sidewall 936, and the partition wall 944. The fluid chamber 946 is configured to receive fluid from the fluid reservoir 924 through a fluid inlet 950 defined in the sidewall 936 of the cleaning brush 910. The apertures 942 defined in the base 934 of the cleaning brush 910 provide fluid communication between the fluid chamber 946 and an exterior of the fluid chamber 946.

The extension member 948 is configured to fluidly connect the fluid outlet 922 to the fluid chamber 946 when the cleaning brush 910 is attached to the head portion 918. The extension member 948 defines a fluid channel 952 that guides fluid discharged from the fluid outlet 922 to the fluid inlet 950 defined in the sidewall 936. The extension member 948 thereby provides fluid communication between the fluid outlet 922 and the fluid chamber 946. In the illustrated embodiment, the extension member 948 is oriented at an oblique angle with respect to the base 934, and is configured to engage the housing 902 proximate the fluid outlet 922.

When the cleaning brush 910 is connected to the head portion 918, fluid within the fluid reservoir 924 may be supplied to the cleaning brush 910 by actuation of the valve 928. More specifically, when the valve 928 is in the open position, fluid within the fluid reservoir 924 flows from the fluid reservoir 924 to the fluid chamber 946 through the fluid conduit 926 and the fluid channel 952. The fluid then flows out of the fluid chamber 946 through the apertures 942 defined in the base 934. The liquid cleaning system 915 and the cleaning brush 910 thereby enable the use of liquid cleaning mediums, such as water, to clean cooking and grilling surfaces. When used on a hot cooking or grilling surface, the use of liquids to "steam" clean the surface is particularly effective at removing food residue that is adhered to the surface.

Figure 11:
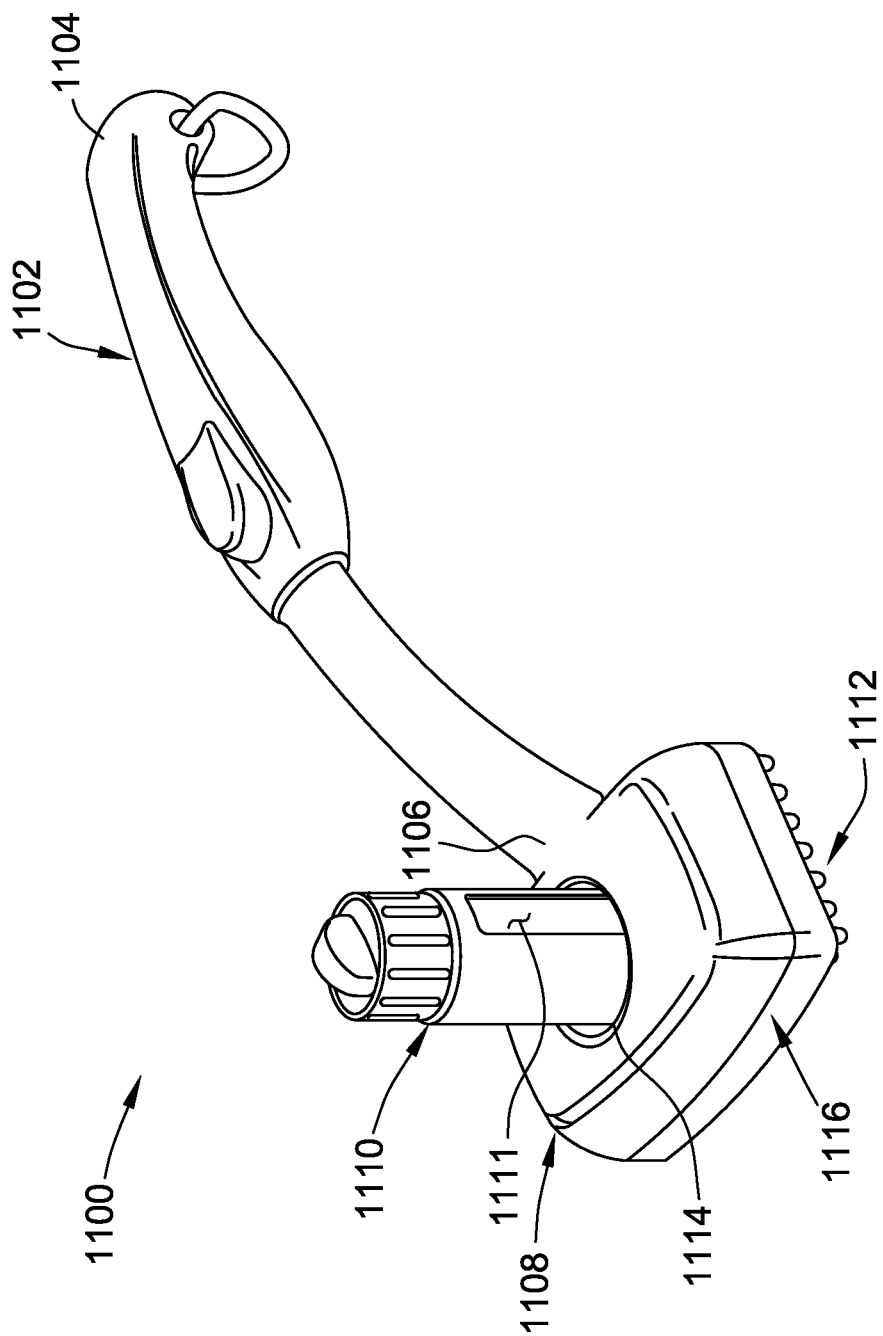
FIG. 11 is a perspective view of yet another suitable embodiment of a grill oiling apparatus including a container and an oil applicator.
Figure 12:
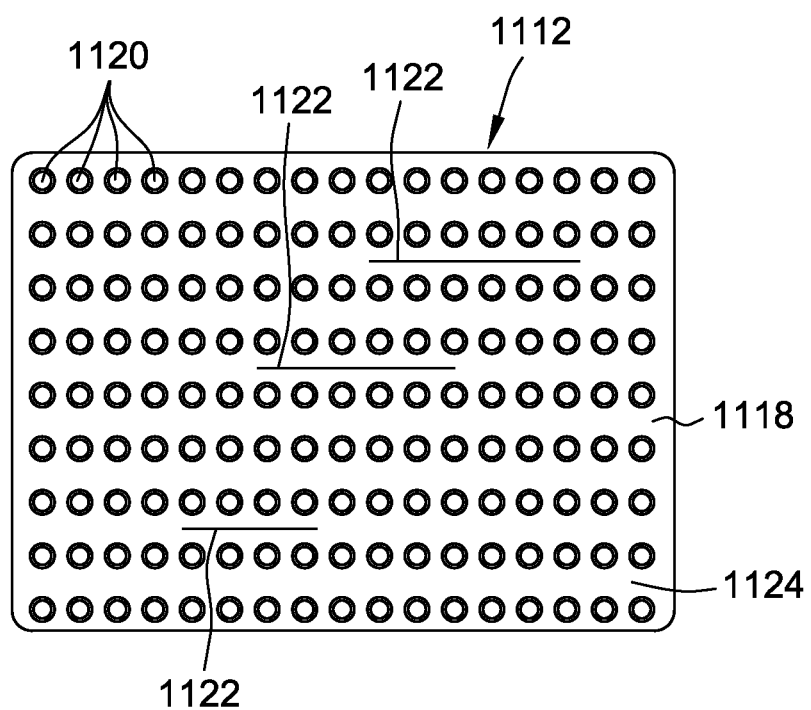
FIG. 12 is a bottom plan view of the oil applicator of the grill oiling apparatus of FIG. 11.

FIGS. 11-12 illustrate another suitable embodiment of a grill oiling apparatus, designated in its entirety by the reference number 1100. The grill oiling apparatus 1100 generally includes a handle 1102 having a first end 1104 and a second end 1106 distal from the first end 1104, a head 1108 disposed at the second end 1106 of the handle 1102, a container 1110 defining a fluid reservoir 1111, and an oil applicator 1112 (broadly, a fluid applicator).

The head 1108 has a receptacle 1114 defined therein sized and shaped to receive the container 1110 therein. The head 1108 includes a mounting plate 1116 configured to be releasably coupled to the oil applicator 1112. The mounting plate 1116 may have substantially the same configuration as the mounting plate 42 described above with reference to FIGS. 1-8.

The container 1110 is disposed within the receptacle 1114. The container 1110 may have substantially the same configuration as the container 14 described above with reference to FIGS. 1-8. That is, the container 1110 may include the vial 56, the valve 58, the shroud 60, and the lid 62 (all shown in FIG. 6). The container 1110 also includes an outlet orifice (not shown in FIG. 11) that provides fluid communication between the fluid reservoir 1111 defined within container 1110 and the oil applicator 1112 when the container 1110 is disposed in the receptacle 1114. The head 1108 may include a stationary finger (not shown) disposed within the receptacle 1114 configured to actuate the valve 58 (shown in FIG. 6) within the container 1110 to permit fluid flow out of the outlet orifice. In other embodiments, the container 1110 may not include the valve 58 (shown in FIG. 6), and fluid flow out of the outlet orifice may be controlled with the ventilation valve 92 and the ventilation opening 90 (both shown in FIG. 6).

The oil applicator 1112 is coupled to the head 1108 by the mounting plate 1116. The oil applicator 1112 includes a base 1118, a peripheral sidewall (not shown in FIG. 12) extending from the base 1118 and around the perimeter of the oil applicator 1112, and a plurality of applicator fingers 1120 extending outward from the base 1118.

The oil applicator 1112 is configured to apply fluids from the fluid reservoir 1111 to a cooking or grilling surface. More specifically, the oil applicator 1112 has a fluid chamber (not shown in FIG. 12) defined therein, and a plurality of flow regulating slits 1122 defined in the base 1118 of the oil applicator 1112. The flow regulating slits 1122 extend from an interior surface (not shown in FIG. 12) of the oil applicator 1112 to an exterior surface 1124 of the oil applicator 1112. The flow regulating slits 1122 are configured to selectively dispense fluid from within the fluid chamber defined by the oil applicator 1112. More specifically, the flow regulating slits 1122 are configured to open in response to a compressive force being applied to the oil applicator 1112. Thus, the supply of fluid from the fluid reservoir 1111 to the exterior surface 1124 of the base 1118 of the oil applicator 1112 may be controlled by compressing the oil applicator 1112 between the mounting plate 1116 and another surface, such as a cooking or grilling surface.

The illustrated oil applicator 1112 includes three flow regulating slits 1122 oriented generally parallel to a longitudinal axis of the oil applicator 1112, and spaced laterally from another. Other suitable embodiments may include more or less than three flow regulating slits 1122. In yet other suitable embodiments, the oil applicator 1112 may include flow regulating slits 1122 oriented in a first direction, and flow regulating slits 1122 oriented in a second direction perpendicular to the first direction. In yet other suitable embodiments, the oil applicator 1112 may include flow regulating slits oriented at an oblique angle to one another. In yet other suitable embodiments, the oil applicator 1112 may include flow regulating slits that intersect one another.

The interior surface (not shown) of the base 1118 may be configured to facilitate even distribution of fluid across the base 1118. For example, the interior surface of the base 1118 may have a raised central portion and fluid guiding channels similar to the interior surface 102 of the base 98 of the oil applicator 18 shown in FIGS. 1-8.

The oil applicator 1112 may be constructed from the same materials as the oil applicator 18 described above with reference to FIGS. 1-8. That is, the oil applicator 1112 may be constructed from elastomeric materials, such as silicone rubbers. The flexible, resilient construction of the oil applicator 1112 facilitates attachment and removal of the oil applicator 1112 to the mounting plate 1116, and also facilitates operation of the flow regulating slits 1122.

As noted above, the supply of fluid from the container 1110 to the exterior of the oil applicator 1112 is controlled by the flow regulating slits 1122 in the oil applicator 1112. More specifically, fluid within the container 1110 may be dispensed from the oil applicator 1112 by applying a compressive force to the oil applicator 1112. Thus, the grill oiling apparatus 1100 does not require a fluid release mechanism to dispense fluid from the container 1110.

Figure 13:
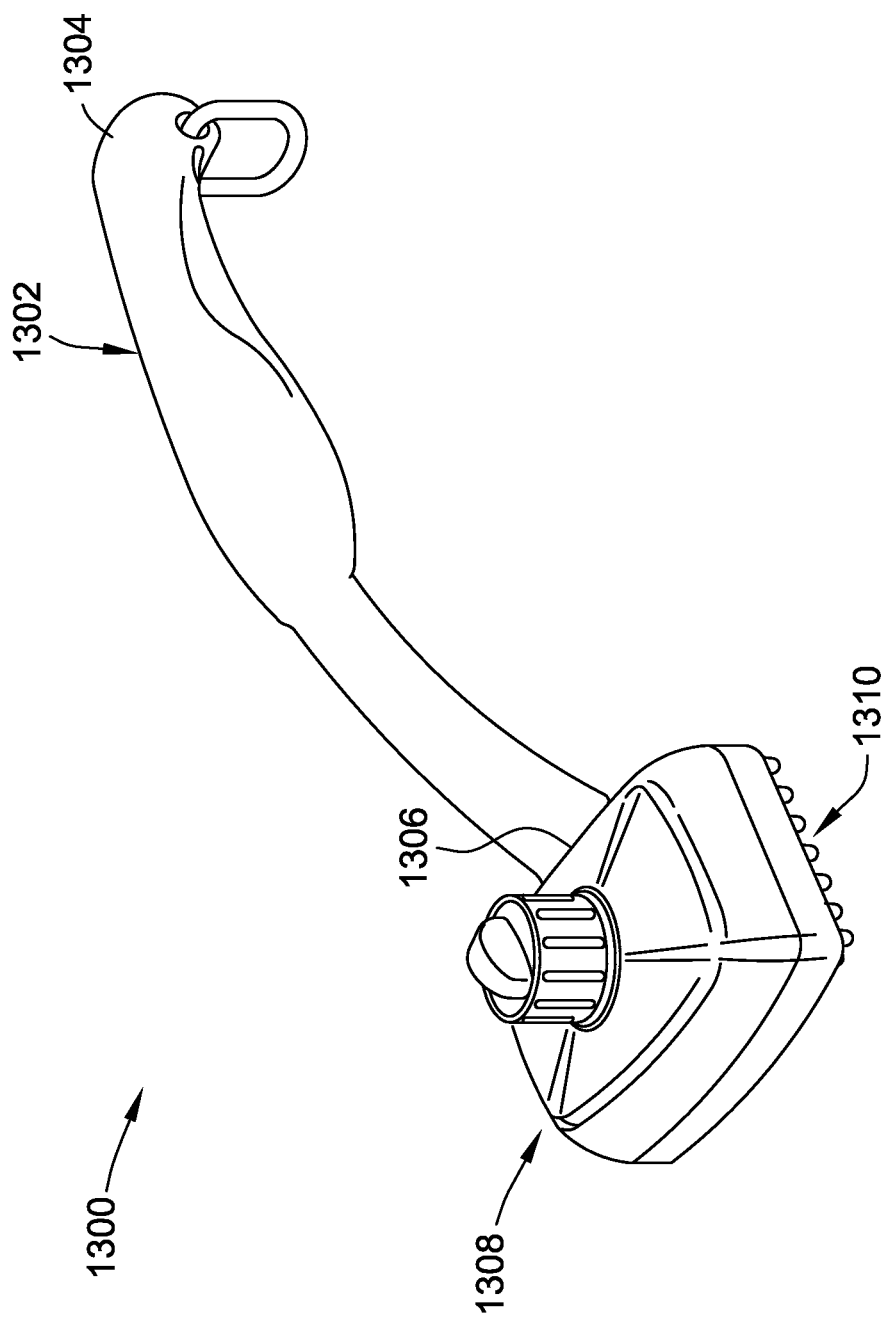
FIG. 13 is a perspective view of yet another suitable embodiment of a grill oiling apparatus.
Figure 14:
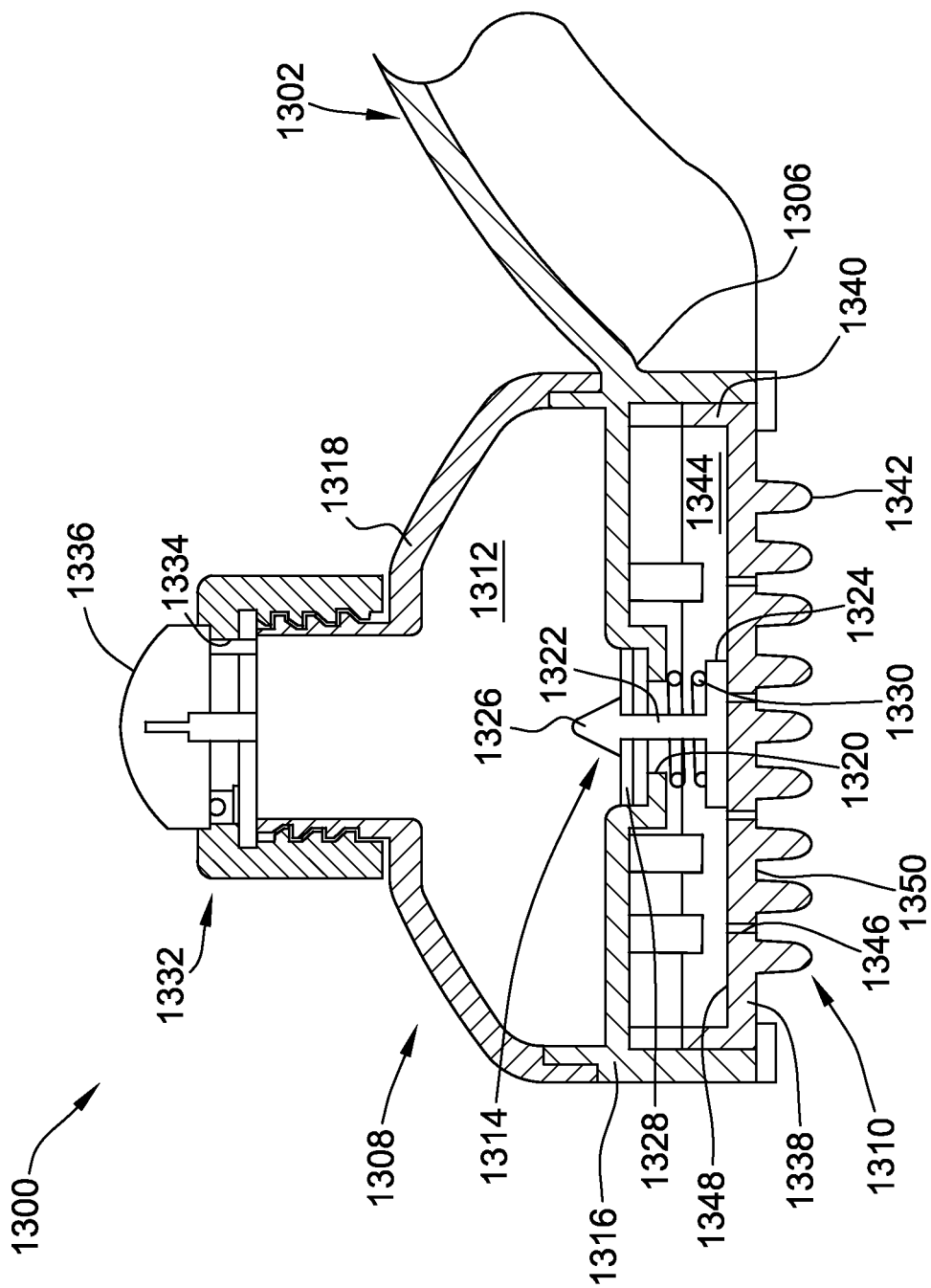
FIG. 14 is an enlarged cross-sectional view of the grill oiling apparatus of FIG. 13.

FIGS. 13-14 illustrate another suitable embodiment of a grill oiling apparatus, designated in its entirety by the reference number 1300. The grill oiling apparatus 1300 generally includes a handle 1302 having a first end 1304 and a second end 1306 distal from the first end 1304, a head 1308 disposed at the second end 1306 of the handle 1302, and an oil applicator 1310 (broadly, a fluid applicator) coupled to the head 1308. The head 1308 has a fluid reservoir 1312 (shown in FIG. 14) defined therein for containing a volume of fluid, such as cooking oil. As described in more detail herein, a valve 1314 provides selective fluid communication between the fluid reservoir 1312 and the oil applicator 1310.

The handle 1302 and the head 1308 may be constructed from a variety of suitable materials including, for example, die cast aluminum, heat resistant plastics (e.g., acrylonitrile butadiene styrene), and combinations thereof. The handle 1302 and the head 1308 may have a unitary construction (i.e., formed integrally with one another), or the handle 1302 and the head 1308 may have a modular construction.

In the illustrated embodiment, the head 1308 includes a mounting plate 1316 and a reservoir cover 1318 coupled to the mounting plate 1316. The mounting plate 1316 generally defines a floor or base of the head 1308, and the reservoir cover 1318 generally defines a top of the head 1308. In the illustrated embodiment, the mounting plate 1316 is formed integrally with, and extends from the handle 1302, and the reservoir cover 1318 is formed separately from the mounting plate 1316. In other suitable embodiments, the mounting plate 1316 and the reservoir cover 1318 may be formed integrally with one another. That is, the mounting plate 1316 and the reservoir cover 1318 may have a unitary construction). In other suitable embodiments, the mounting plate 1316 and the reservoir cover 1318 are both formed integrally with the handle 1302.

The mounting plate 1316 and the reservoir cover 1318 collectively define the fluid reservoir 1312. The reservoir cover 1318 forms a seal with the mounting plate 1316 to prevent fluids within the fluid reservoir 1312 from leaking. The mounting plate 1316 has an outlet orifice 1320 defined therein providing fluid communication between the fluid reservoir 1312 and the oil applicator 1310 when the oil applicator 1310 is coupled to the mounting plate 1316.

The valve 1314 is disposed within the outlet orifice 1320 and is configured to control fluid flow out of the fluid reservoir 1312. The valve 1314 is moveable between a closed position (shown in FIG. 14) in which the valve inhibits fluid flow out of the fluid reservoir 1312, and an open position in which the valve 1314 permits fluid flow out of the fluid reservoir 1312. The valve 1314 includes a valve stem 1322, a valve base 1324 disposed at a first end of the valve stem 1322, and a valve member 1326 disposed at second end of the valve stem 1322 distal from the valve member 1326. The valve member 1326 is configured to seal the outlet orifice 1320 when the valve 1314 is in the closed position (shown in FIG. 14). An elastomeric seal 1328 is disposed between the valve member 1326 and the mounting plate 1316 to facilitate sealing of the outlet orifice 1320.

A valve spring 1330 (broadly, a biasing member) is disposed between the valve base 1324 and the mounting plate 1316 to bias the valve 1314 towards the closed position. The valve spring 1330 biases the valve base 1324 away from the mounting plate 1316 and against the oil applicator 1310 when the oil applicator 1310 is coupled to the mounting plate 1316.

The head 1308 also includes a lid 1332 configured to be releasably connected to the reservoir cover 1318 to seal the fluid reservoir 1312. The lid 1332 may have substantially the same configuration and be constructed from the same materials as the lid 62 described above with reference to FIGS. 1-8. In the illustrated embodiment, for example, the lid 1332 includes threads configured to engage complementary threads on the reservoir cover 1318. Further, the lid 1332 has a ventilation opening 1334 defined therein that provides fluid communication between the fluid reservoir 1312 and the exterior environment. The ventilation opening 1334 permits air flow into the fluid reservoir 1312 to prevent a vacuum or low pressure condition from developing in the fluid reservoir 1312 and inhibiting fluid flow. The lid 1332 also includes a ventilation valve 1336 moveable between an open position and a closed position to control air flow through the ventilation opening 1334. In the illustrated embodiment, the ventilation valve 1336 is rotatable between the open and closed positions. The ventilation valve 1336 can be positioned at various intermediate positions between the open and closed positions to partially obstruct the ventilation opening 1334. The ventilation valve 1336 thereby enables a user to control the rate of air flow through the ventilation opening 1334, and consequently, the fluid flow rate out of fluid reservoir 1312.

The oil applicator 1310 is coupled to the head 1308 by the mounting plate 1316, and is coupled in fluid communication with the fluid reservoir 1312. The oil applicator 1310 includes a base 1338, a peripheral sidewall 1340 extending from the base 1338 and around the perimeter of the oil applicator 1310, and a plurality of applicator fingers 1342 extending outward from the base 1338. The oil applicator 1310 has a fluid chamber 1344 defined therein, and a plurality of apertures 1346 defined in the base 1338 of the oil applicator 1310. The apertures 1346 extend from an interior surface 1348 of the oil applicator 1310 to an exterior surface 1350 of the oil applicator 1310. In addition to or as an alternative to the apertures 1346, the oil applicator may include flow regulating slits, such as the flow regulating slits 1122 described above with reference to FIGS. 11 and 12.

The oil applicator 1310 is configured to apply fluids from the fluid reservoir 1312 to a cooking or grilling surface. Specifically, as noted above, the valve base 1324 is biased against the oil applicator 1310 (specifically, the interior surface 1348 of the base 1338). When a compressive force is applied to the exterior surface 1350 of the base 1338, the valve base 1324 is urged upwards and against the biasing force of the valve spring 1330. When sufficient pressure is applied to the exterior surface 1350 of the base 1338, the valve 1314 is opened, and fluid is permitted to flow out of the fluid reservoir 1312 through outlet orifice 1320 and into the fluid chamber 1344. Fluid within the fluid chamber 1344 flows out of the apertures 1346, and can be applied to a desired cooking surface, such as a grill grate.

The oil applicator 1310 may be constructed from the same materials as the oil applicator 18 described above with reference to FIGS. 1-8. That is, the oil applicator 1310 may be constructed from elastomeric materials, such as silicone rubbers. The flexible, resilient construction of the oil applicator 1310 facilitates attachment and removal of the oil applicator 1310 to the mounting plate 1316, and also facilitates actuation of the valve 1314.

The interior surface 1348 of the base 1338 may be configured to facilitate even distribution of fluid across the base 1338. For example, the interior surface 1348 may have a raised central portion and fluid guiding channels similar to the interior surface 102 of the base 98 of the oil applicator 18 shown in FIGS. 1-8.

Embodiments of the grill oiling apparatus described herein provide several advantages over known grill oiling apparatus. For example, the grill oiling apparatus described herein utilize a fluid release mechanism to selectively dispense fluid within a container. The fluid release mechanism includes a button operably coupled to a valve within the container. Actuation of the button causes the valve to actuate between open and closed positions, thereby enabling selective dispensing of the fluid within the container. The fluid release mechanism provides superior control over the amount of fluid that is dispensed from the grill oiling apparatus as compared to conventional grill oiling apparatus that use absorbent articles soaked in oil to apply oil to a cooking or grilling surface. Additionally, the use of containers provides greater fluid carrying capacity as compared to conventional grill oiling apparatus that used absorbent articles, such as sponges or cloths, to retain oil.

Further, in some embodiments, the button of the fluid release mechanism is disposed along a handle portion of the grill oiling apparatus. The fluid release mechanism thus enables a user to hold the grill oiling apparatus by the handle portion and dispense fluid from the container using a single hand. Additionally, the fluid release mechanism enables a user to dispense fluid from the container onto a hot cooking surface without having to reach over an open heat source or the hot cooking surface.

Further, in some embodiments, the grill oiling apparatus includes a detachable cleaning brush and a built-in liquid cleaning system. The liquid cleaning system provides fluids, such as water or other cleaning solutions, to the cleaning brush to facilitate cleaning a cooking or grilling surface. The grill oiling apparatus thus provides a single utensil that can be used to both clean a cooking or grilling surface, and apply cooking oil to the cooking or grilling surface.

Additionally, in some embodiments, the grill oiling apparatus includes a fluid lockout feature that prevents fluids, such as cooking oils, from being dispensed while the cleaning brush is attached to the grill oiling apparatus. The fluid lockout feature thereby prevents fluids from contaminating the cleaning brush and surfaces being cleaned with the cleaning brush.

Additionally, in some embodiments, the grill oiling apparatus includes a flexible, resilient oil applicator for applying cooking oils to a cooking surface, such as a grilling surface. The flexible, resilient construction of the oil applicator facilitates attachment and removal of the oil applicator to the grill oiling apparatus, thereby facilitating cleaning and replacing the oil applicator.

Additionally, in some embodiments, the grill oiling apparatus includes an oil applicator having flow regulating slits defined therein. The flow regulating slits enable selective dispensing of fluids within the oil applicator by applying a compressive force to the oil applicator. The flow regulating slits thereby enable controlled dispensing of fluids, such as cooking oils, without the use of a fluid release mechanism.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A grill oiling apparatus comprising:
   a handle having a first end and a second end distal from the first end;
   a head disposed at the second end of the handle, the head having a receptacle defined therein;
   a container disposed within the receptacle, the container having a fluid reservoir defined therein, the container including a valve configured to control fluid flow out of the fluid reservoir;
   a fluid applicator coupled to the head, the fluid applicator including a plurality of apertures defined therein;
   a fluid release mechanism operably coupled to the valve and configured to actuate the valve between a closed position and an open position to provide fluid communication between the fluid reservoir and the apertures;
   a detachable cleaning brush having a cavity defined therein, wherein the fluid applicator is enclosed within the cavity when the cleaning brush is connected to the grill oiling apparatus; and
   a fluid lockout feature configured to inhibit actuation of the fluid release mechanism when the cleaning brush is attached to the grill oiling apparatus.

2. The grill oiling apparatus as set forth in claim 1, wherein the fluid release mechanism comprises a button operably coupled to the valve by at least one linking arm, the button configured to actuate the fluid release mechanism.

3. The grill oiling apparatus as set forth in claim 2, wherein the fluid release mechanism further comprises:
   a first linking arm connected to the button, the first linking arm configured to pivot about a pivot point when the fluid release mechanism is actuated by the button; and
   a second linking arm having a first end connected to the first linking arm and a second end configured to engage the valve upon actuation of the fluid release mechanism to actuate the valve.

4. The grill oiling apparatus as set forth in claim 2, wherein the button is disposed on the handle.

5. The grill oiling apparatus as set forth in claim 1, wherein the cleaning brush comprises an engagement finger configured to activate the fluid lockout feature upon attachment of the cleaning brush to the grill oiling apparatus.

6. The grill oiling apparatus as set forth in claim 1 further comprising a visual indicator disposed within the container and operably coupled to the valve, the visual indicator configured to indicate the position of the valve to a user.

7. The grill oiling apparatus as set forth in claim 6, wherein the container includes a vial and a shroud at least partially surrounding the vial, the shroud having a window defined therein providing visual line-of-sight to the visual indicator.

8. The grill oiling apparatus as set forth in claim 1, wherein the fluid applicator includes a base, the apertures extending from an interior surface of the base to an exterior surface of the base, the interior surface of the base having a fluid guiding channel defined therein configured to distribute fluids across the base of the fluid applicator.

9. A grill oiling apparatus comprising:
   a housing including a handle portion and a head portion disposed distal from the handle portion, the head portion having a receptacle defined therein;
   a container disposed within the receptacle, the container having a first fluid reservoir defined therein;
   a fluid applicator coupled to the head portion, the fluid applicator including a plurality of apertures defined therein;
   a fluid release mechanism operable to selectively release fluid from the container and through the apertures defined in the fluid applicator;
   a liquid cleaning system comprising:
      a second fluid reservoir enclosed within the housing; and
      a valve configured to control fluid flow out of the second fluid reservoir; and
   a detachable cleaning brush having a plurality of apertures defined therein, wherein the valve is configured to provide selective fluid communication between the second fluid reservoir and the cleaning brush apertures when the cleaning brush is attached to the grill oiling apparatus.

10. The grill oiling apparatus as set forth in claim 9, wherein the housing has a fluid outlet defined therein, the fluid outlet fluidly connected to the second fluid reservoir, the cleaning brush having a fluid chamber defined therein and including an extension member configured to fluidly connect the fluid chamber with the fluid outlet when the cleaning brush is attached to the grill oiling apparatus.

11. The grill oiling apparatus as set forth in claim 9 further comprising a fluid lockout feature configured to inhibit actuation of the fluid release mechanism when the cleaning brush is attached to the grill oiling apparatus.

12. The grill oiling apparatus as set forth in claim 11, wherein the cleaning brush comprises an engagement finger configured to activate the fluid lockout feature upon attachment of the cleaning brush to the grill oiling apparatus.

13. The grill oiling apparatus as set forth in claim 9, wherein the valve is a first valve, the container comprising a second valve configured to control fluid flow out of the first fluid reservoir, the fluid release mechanism comprising a button operably coupled to the second valve by at least one linking arm, the button configured to actuate the fluid release mechanism.

14. The grill oiling apparatus as set forth in claim 13, wherein the fluid release mechanism further comprises:
   a first linking arm pivotably connected to the housing at a pivot point, the first linking arm connected to the button; and
   a second linking arm having a first end connected to the first linking arm and a second end configured to engage the second valve upon actuation of the fluid release mechanism to actuate the valve.

15. The grill oiling apparatus as set forth in claim 13, wherein the button is disposed on the handle.

16. A grill oiling apparatus comprising:
   a handle having a first end and a second end distal from the first end;
   a head disposed at the second end of the handle, the head having a receptacle defined therein;
   a container disposed within the receptacle, the container having a fluid reservoir defined therein, the container including:
      a valve configured to control fluid flow out of the fluid reservoir;

a visual indicator disposed within the container and operably coupled to the valve, the visual indicator configured to indicate the position of the valve to a user;

a vial; and a shroud at least partially surrounding the vial, the shroud having a window defined therein providing visual line-of-sight to the visual indicator;

a fluid applicator coupled to the head, the fluid applicator including a plurality of apertures defined therein; and a fluid release mechanism operably coupled to the valve and configured to actuate the valve between a closed position and an open position to provide fluid communication between the fluid reservoir and the apertures.

17. The grill oiling apparatus as set forth in claim 16, wherein the fluid release mechanism comprises a button operably coupled to the valve by at least one linking arm, the button configured to actuate the fluid release mechanism.

18. The grill oiling apparatus as set forth in claim 17, wherein the fluid release mechanism further comprises:

a first linking arm connected to the button, the first linking arm configured to pivot about a pivot point when the fluid release mechanism is actuated by the button; and a second linking arm having a first end connected to the first linking arm and a second end configured to engage the valve upon actuation of the fluid release mechanism to actuate the valve.

19. The grill oiling apparatus as set forth in claim 16, further comprising a detachable cleaning brush having a cavity defined therein, wherein the fluid applicator is enclosed within the cavity when the cleaning brush is connected to the grill oiling apparatus.

20. A grill oiling apparatus comprising:

a housing including a handle portion and a head portion disposed distal from the handle portion, the head portion having a receptacle defined therein;

a container disposed within the receptacle, the container having a first fluid reservoir defined therein and comprising a first valve configured to control fluid flow out of the first fluid reservoir;

a fluid applicator coupled to the head portion, the fluid applicator including a plurality of apertures defined therein;

a fluid release mechanism operable to selectively release fluid from the container and through the apertures defined in the fluid applicator, the fluid release mechanism comprising:

a button configured to actuate the fluid release mechanism;

a first linking arm pivotably connected to the housing at a pivot point, the first linking arm connected to the button; and a second linking arm having a first end connected to the first linking arm and a second end configured to engage the first valve upon actuation of the fluid release mechanism to actuate the first valve; and a liquid cleaning system comprising:

a second fluid reservoir enclosed within the housing; and a second valve configured to control fluid flow out of the second fluid reservoir.

* * * * *